United States Patent Office 3,440,087
Patented Apr. 22, 1969

3,440,087
POLYUREA COATING FOR COPPER
Marwan R. Kamal and Harold A. Wittcoff, Minneapolis, Minn., assignors to General Mills, Inc., a corporation of Delaware
No Drawing. Filed Oct. 5, 1965, Ser. No. 493,241
Int. Cl. B44d 1/30; C09d 3/48
U.S. Cl. 117—132                10 Claims

ABSTRACT OF THE DISCLOSURE

Copper and copper-containing alloys are protected by coating the same with a polyurea prepared by reacting a polyisocyanate having the formula

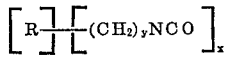

where $y$ is 0 or 1, $x$ is 2 to about 4 and R is the hydrocarbon group of polymeric fat acids with aldimines or ketimines of aliphatic polyamines in the presence of moisture.

---

The present invention relates to a process of protecting copper, copper-containing alloys containing substantial proportions of copper such as bronze and brass, and to copper products so protected.

Copper metal is notorious for its ease of oxidation and thus ease of corrosion. It is also difficult to make protective coatings for copper because of the difficulty of securing good adhesion.

A protective coating for copper generally must meet two basic requirements. First, the coating must adhere to the copper and the adhesion must be retained under adverse weather conditions. Second, the coating must have resistance to water permeability and thus protect the copper from contact with water.

The protective coating of the present invention has shown excellent adhesion to copper metal and good resistance to water permeability. It has thus been found to be admirably suitable for the purpose of protecting copper.

It is therefore an object of the present invention to provide a novel process for protecting copper and to provide a copper product with a protective coating.

The process of protecting copper involves the application to the copper of a particular coating composition capable of curing at room temperature to produce cured polyurea compositions. The composition is based on the reaction of a polyamine composition with a polyisocyanate to form the corresponding polyurea. The polyamino compound employed, however, is either partially or totally blocked to give a product which does not have more than one active hydrogen capable of reacting with the polyisocyanate. The composition containing the blocked polyamine compound and the polyisocyanate is stable in the absence of moisture and can be converted to the final cured polyurea product by simple exposure to moisture which converts the blocked polyamine compound to the free polyamine which is then capable of reacting with the polyisocyanate.

The blocked polyamine compound is a ketimine or an aldimine made by the reaction of a primary amine with a ketone or an aldehyde. In the absence of moisture, the ketimine or aldimine is stable in the presence of the polyisocyanate but in the presence of moisture, even atmospheric moisture, the ketimine or aldimine reforms the primary amine compound which is then capable of reacting with the polyisocyanate. Thus, in using the composition of the present invention, it is possible to coat a copper article with the mixture and expose it to moisture from the atmosphere to form a polyurea coating which becomes tack-free in a short time and which, after thorough curing at room temperature, exhibits excellent properties. Some of the components of this system are liquids and it is thus possible to form solventless coatings and thus build up thicker coatings in fewer applications. Of course, where desired, solvent systems can be used. The polyisocyanates used in the present invention are derived from polymeric fat acids and have the following idealized structural formula:

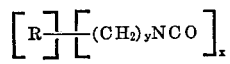

where $y$ is 0 or 1, $x$ is an integer of 2 to about 4 and R is the hydrocarbon group of polymeric fat acids. Preferably, $x$ is 2.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

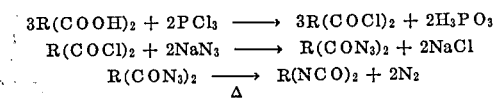

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

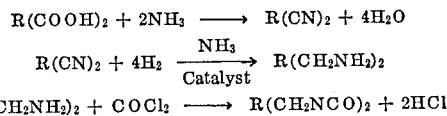

The polymeric fat acids, useful as the starting materials for preparing our polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and caetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

The polyisocyanates derived from polymeric fat acids are particularly desirable for a number of reasons. Coatings made therefrom have good wetting properties, good adhesion characteristics and good water and corrosion resistance. Elastomeric polyureas based thereon are characterized by a high degree of extensibility which is retained even at low temperatures. Moreover, these polyisocyanates, due to their low vapor pressure at ambient conditions are easy to handle and toxicity hazards are minimized. Likewise, because of their low reactivity toward active hydrogen compounds and the essential ineffectiveness of tertiary amine groups as catalysts for these polymeric fatty polyisocyanates, it is possible to make mixes of the polyetimines and polyaldemines with these isocyanates and the compositions will have reasonable pot life in contrast to some of the more reactive aliphatic polyisocyanates and aromatic polyisocyanates.

The above-referred to polyisocyanates are sufficiently slow reacting as to be useful in the present invention for preparation of stable composition in admixture with the aldimines or ketimines.

The polisocyanates which may be used in the present invention may be used in the form of the free isocyanate or, as is customarily done, they may be used in the form of so-called prepolymers. These prepolymers are reaction products of polyols or polyester polyols with the polyisocyanates such that essentially 1 mol of polyisocyanate is reacted with each equivalent of hydroxyl group, the product thus being an isocyanate terminated prepolymer. These terminal isocyanate groups may then be used for reaction with the ketimines and aldimines. It is to be understood that the term "polyisocyanate" therefore is intended to include the isocyanate terminated prepolymers of simple polyols, polyether polyols, and polyester polyols. Typical polyols include trimethylolpropane, 1,4,6-hexanetriol, glycerol, ethylene glycol, diethylene glycol, 1,4-butanediol, 1,4-butene diol, 1,3-butane diol and the like. The polyether polyols are hydroxy-terminated homopolymer and copolymer of ethylene oxide, propylene oxide, butylene oxide, and the like. The polyester polyols are hydroxyl terminated polymers which may be derived from the above polyols and any of the typical polybasic acids used for the preparation of polyesters may be used. It is to be understood, of course, that when any prepolymers of the above type are described, the ultimate cured composition will contain both urethane groups and urea groups. The term "polyureas," however, is still applicable to these compositions in that they include a multiple of urea groups.

Virtually any polyamine capable of reacting with an isocyanate and preferably having not more than 2 secondary amine groups may be used for the purposes of the present invention. The preferred polyamines are the alkylene polyamines and the substituted alkylene polyamines. The preferred polyamines are selected from the following formulas:

(A)
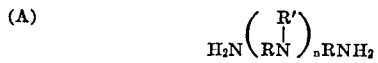

where R is a difunctional aliphatic hydrocarbon group containing from 2–48 carbon atoms and may include the dimer hydrocarbon radical of dimerized fat acids, R' is hydrogen or an aliphatic hydrocarbon group containing from 1–24 carbon atoms and $n$ is an integar of from 0–20.

(B) $H_2N(RNH)_nRNH_2$ where R and $n$ are as above defined, but preferably R is alkylene of 2–6 carbon atoms and $n$ is 0 to 3.

(C)
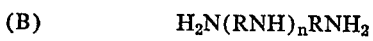

where R and R' are as above defined but preferably R is alkylene of 2–6 carbon atoms and R' is fatty of 8–24 carbon atoms.

(D)

where R is as above defined but preferably is alkylene of 2–6 carbon atoms and R" is the dimer hydrocarbon radical of dimerized fat acids and preferably contains from 24–48 carbon atoms. All of the above amines should preferably not contain more than 2 secondary amine groups.

Typical of the amines which may be used are ethylene diamine, diethylene triamine, triethylene tetramine, etc., and the corresponding propylene, butylene, etc. amines; N,N - diaminopropyl stearylamine, etc.; methyl iminobispropylamine, dimer fatty amine, tetra aminomethyl dimer fatty amine, etc.

The primary amine groups in the above polyamine compounds are converted to aldimines or ketimines by reaction with a carbonyl compound. Such carbonyl compound may have the following theoretical structural formula:

in which $R_1$ and $R_2$ are selected from the group consisting of H and alkyl and are each substantially inert to the aldimine or ketimine base formation reaction. A carbonyl compound is preferably a lower molecular weight ($C_2$ to $C_6$ aldehyde or ketone) that is volatile so that an unreacted excess thereof may easily be removed after the water has reacted to liberate the free amine and the aldehyde or ketone compound. It is often preferred to use a carbonyl compound which boils below or near the boiling point of water or which readily distills with water. Preferred examples of the carbonyl compound include such volatile $C_2$ to $C_6$ aldehydes and ketones as acetone, methylethylketone, diethylketone, methylpropylketone, methylisopropylketone, methyl n-butyl ketone, methylisobutyl ketone, methyltertiary butyl ketone, ethylisopropyl ketone, acetaldehyde, propionaldehyde, butyraldehyde, isobutyraldehyde, etc. (i.e. up to and including hexanone and hexanol).

In preparing the compositions of the present invention, two components are simply mixed and are then preserved out o fcontact with moisture, either added moisture or atmospheric moisture. The components are preferably used in approximately equivalent proportions of amine and isocyanate. However, these proportions may be varied in the range of 0.7 to 1.0 either way. The components which are liquid may be simply blended to obtain the mixed liquid. In the event the two liquids are not comupatible, they may be made compatible by means of suitable solvents. The solvents may likewise be used where one or more of the components is a solid. The products may be packaged and maintained out of contact with moisture until they are ready for use. When used, it is preferred to rely upon moisture from the relatively high humidity of the atmosphere although it is possible to add moisture directly to the composition if desired. In view of the difficulty of maintaining the mixed components in a condition, it is preferred to mix them shortly before using.

The following example will serve to illustrate the invention but are not to be considered limitations thereof.

EXAMPLE I 131 grams of iminobispropylamine and 300 grams of methylisobutyl ketone were dissolved in 350 ml. of benzene in a 2 liter 3-neck round bottom flask equipped with a Barrett trap connected to a condenser which was fitted with a Drierite drying tube. The flask was heated and the solution refluxed until no more water came off. The flask was then cooled and the benzene and excess methylisobutyl ketone were removed under reduced pressure to get a residue weighing 291 grams. Analysis of the residue by infra red showed it to be consistent with the expected diketimine.

A copper coating was made from this diketimine containing the following ingredients:

30.0 parts by weight of dimeryl isocyanate prepared from tall oil fatty acids by the phosgene route
9.8 parts by weight of the above diketimine
21.4 parts by weight mineral spirits.

The last two components were first mixed together and then the dimeryl isocyanate was added to the resulting solution. The mixture which gains in viscosity a short time after mixing was then applied on sanded copper panels to give a wet film thickness of 1.5 or 3.0 mils. The films which became tack-free in one hour were then allowed to cure at room temperature. The adhesion of the coating to copper was checked after 7 to 14 days by the cross cut adhesion test. Results obtained showed the films to be adhering extremely well to the copper panels. It was also apparent that the part of the copper panels which was covered with the coating had no evidence of corrosion or air oxidation while the non-coated portion has corroded considerably in the meantime.

The copper panels coated with this polyurea coating were exposed in a salt-spray cabinet for a period of four weeks. No apparent corrosion or blistering was observed on the coated portions of the panels.

EXAMPLE II

A coating composition was prepared from the following ingredients:

|   | Parts by wt. |
| --- | --- |
| Dimeryl isocyanate | 60.0 |
| Diketimine from diethylenetriamine and methyl isobutyl ketone | 20.0 |
| Mineral spirits | 20.0 |

The composition was prepared and applied to sanded and nonsanded copper panels as described in the preceding example. The results were the same, with some improved results being obtained with the sanded copper panels.

While the examples illustrate two particular forms of the invention, it is to be understood that considerable variation is possible. Similar results are also obtainable with copper-containing alloys such as bronze and brass with the other aldimines and ketimines described herein. Likewise, similar variation is possible in the relative proportions of the materials employed and also in the solvents used. Obviously, these solvents are preferably free from functional groups which are reactive with either amine of the isocyanate as in some instances this might impair the protection obtained. In general, the hydrocarbon solvents which are relatively inert as respects reactants are preferred. These may be aliphatic or aromatic. It is obviosuly possible to rely on moisture artificially added either to the coating or to the film instead of the atmosphere moisture referred to in the examples.

While the above description has been with particular reference to the specific example, it is to be understood that the invention is not restricted thereto but may be varied within the scope of the appended claims.

The embodiments of the invention in which an exclusive property or privilege is claimed are defined as follows:

1. A process of protecting copper and copper-containing aloys which comprises (1) applying thereto a composition of matter comprising:
    (A) A polyisocyanate having the formula

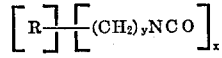

in which $y$ is 0 or 1, $x$ is an integer of from 2 to about 4 and R is the hydrocarbon group of polymeric fat acids $R(COOH)_x$, said polymeric fat acids having been prepared by polymerizing fat acids of 8 to 24 carbon atoms, and
    (B) a compound selected from the group consisting of (i) aldimines prepared by reacting an aldehyde with an aliphatic polyamine and (ii) ketimines prepared by reacting a ketone with an aliphatic polyamine, said polyisocyanate (A) and compound (B) being used in an equivalent ratio of 0.7–1.0 to 1.0–0.7, and (2) allowing the composition to cure to a polyurea in the presence of moisture.

2. The process according to claim 1 in which the polyamine is an alkylene polyamine.

3. The process according to claim 1 in which the aliphatic polyamine has the following formula:

$$H_2N(RNH)_nRNH_2$$

in which R is an alkylene group of 2–6 carbon atoms and $n$ is an integer of from 0–3.

4. The process according to claim 1 in which the polyamine has the formula

in which R is an alkylene group of from 2–6 carbon atoms and R' is an aliphatic hydrocarbon group containing from 8–24 carbon atoms.

5. The process of claim 1 in which the aldehyde and ketone have the formula

where $R_1$ and $R_2$ are selected from the group consisting of H and alkyl groups, the total number of carbon atoms in $R_1$ and $R_2$ being from 1 to 5.

6. The process of claim 1 in which $y$ is 1, $x$ is 2 and the polyisocyanate (A) and compound (B) are used in aproximately equivalent amounts.

7. Copper and copper-containing alloys coated with a cured polyurea prepared by reacting on the surface of the copper and copper-containing alloys and in the presence of moisture
    (A) A polyisocyanate having the formula

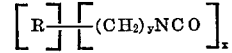

in which $y$ is 0 or 1, $x$ is an integer of from 2 to about 4 and R is the hydrocarbon group of polymeric fat acids $R(COOH)_x$, said polymeric fat acids having been prepared by polymerizing fat acids of 8–24 carbon atoms, and
    (B) a compound selected from the group consisting of
        (i) aldimines prepared by reacting an aldehyde with an aliphatic polyamine and (ii) ketimines prepared by reacting a ketone with an aliphatic polyamine, said polyisocyanate A. and compound B. being used in an equivalent ratio of 0.7–1.0 to 1.0–0.7.

8. Product according to claim 7 in which the aliphatic polyamine has the formula $$H_2N(RNH)_nRNH_2$$

in which R is an alkylene group of 2–6 carbon atoms and $n$ is an integer of from 0–3.

9. Product according to claim 7 in which the aldehyde and ketone have the formula

where $R_1$ and $R_2$ are selected from the group consisting of H and alkyl groups, the total number of carbon atoms in $R_1$ and $R_2$ being from 1 to 5.

10. Product according to claim 9 in which $y$ is 1, $x$ is 2, $n$ is 1, $R_1$ is methyl, $R_2$ is isobutyl, the compound is a ketimine and the polyisocyanate and ketimine are used in approximately equivalent amounts.

References Cited

UNITED STATES PATENTS 3,310,533   3/1967   McElroy _____ 117—132 X

FOREIGN PATENTS 720,121   10/1965   Canada.

OTHER REFERENCES

Netherlands Octorooiraad, Octorooiaarrage. No. 6400-891, Aug. 5, 1964, 260—77.5.

RALPH S. KENDALL, *Primary Examiner.*

U.S. Cl. X.R.

117—161, 260—77.5